(12) United States Patent
McMakin

(10) Patent No.: US 6,988,773 B2
(45) Date of Patent: Jan. 24, 2006

(54) FOOT REST STRUCTURE

(76) Inventor: Billy J. McMakin, 111 Lucille Pl., Kingsport, TN (US) 37663

( * ) Notice: Subject to any disclaimer, the term of this patent is extended or adjusted under 35 U.S.C. 154(b) by 3 days.

(21) Appl. No.: 10/678,824

(22) Filed: Oct. 3, 2003

(65) Prior Publication Data

US 2004/0070245 A1 Apr. 15, 2004

Related U.S. Application Data

(60) Provisional application No. 60/417,274, filed on Oct. 9, 2002.

(51) Int. Cl.
*A47C 16/00* (2006.01)

(52) U.S. Cl. .............................. 297/423.4; 297/423.45; 297/256.16

(58) Field of Classification Search ............. 297/250.1, 297/219.12, 423.4, 423.44, 423.45, 256.16
See application file for complete search history.

(56) References Cited

U.S. PATENT DOCUMENTS

| | | | | |
|---|---|---|---|---|
| 5,560,679 | A | * | 10/1996 | Barnholdt ............... 297/423.45 |
| 6,237,996 | B1 | * | 5/2001 | Chen et al. ............... 297/423.4 |
| 6,561,588 | B1 | * | 5/2003 | Brady ................... 297/423.4 X |
| 6,796,606 | B2 | * | 9/2004 | Marshall ................. 297/219.12 |
| 6,860,557 | B2 | * | 3/2005 | Jonasson ........... 297/219.12 X |

\* cited by examiner

*Primary Examiner*—Anthony D. Barfield

(57) ABSTRACT

A foot rest for use with a child's restraining seat and having a mounting positioned at the forward end of the seat and operable to adjust the height and angularity of the foot rest with respect to the seat such as to afford comfort to the infant regardless of its leg size.

3 Claims, 2 Drawing Sheets

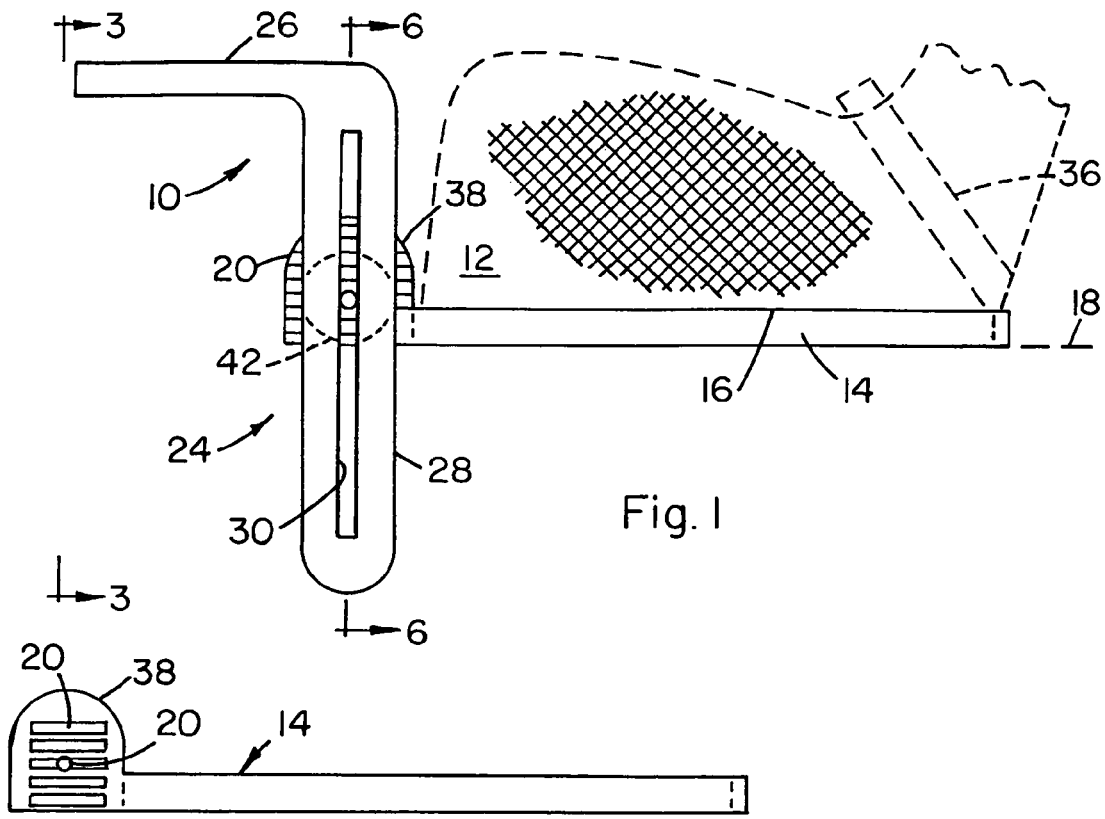
Fig. 1
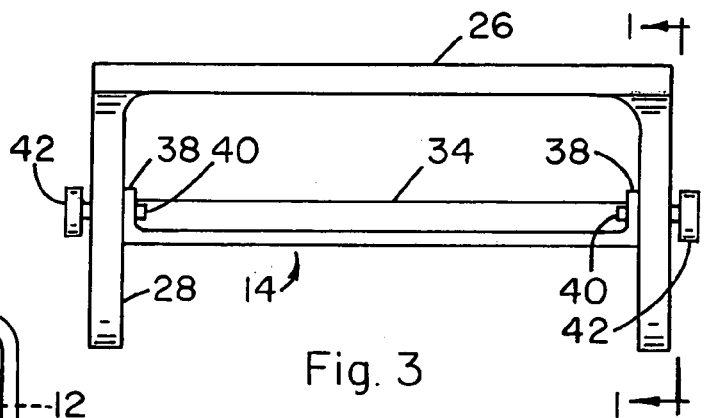
Fig. 2
Fig. 3
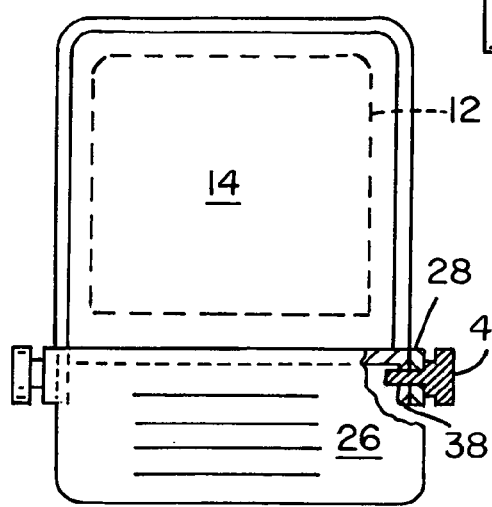
Fig. 4

FOOT REST STRUCTURE

This application claims priority under 35 U.S.C. 119(e)(1) based on Applicants Provisional U.S. Patent Application Ser. No. 60/417,274 filed Oct. 9, 2002 and titled "FOOT REST STRUCTURE".

BACKGROUND OF THE INVENTION

1. Field

This invention concerns a unique foot rest structure for use with restraining seats for use in automotive vehicles for comforting infants and children while traveling. The structure can be a stand alone design to work in cooperation with a conventional child's restraining seat, or portions of the structure such as the base can be incorporated into the conventional restraining seat as manufactured.

2. Prior Art

Applicant is unaware of any prior art which is relevant to the present invention.

SUMMARY OF THE INVENTION

A foot rest structure for use with a child's restraining seat which is adapted to rest on a seat of an automobile, truck or other type vehicle, wherein the foot rest structure has a platform adapted to be positioned in front of the restraining seat and on which the child's feet can rest, wherein mounting means is provided for mounting the platform in engagement with the restraining seat and wherein, in one preferred embodiment, the mounting means provides for vertical (and angular if desired) position adjustment for the platform relative to the strapped in position of the restraining seat.

BRIEF DESCRIPTION OF THE DRAWINGS

The invention will be further understood from the following description and drawings wherein the figures are not intended to be to scale or in actual proportions, and wherein:

FIG. 1 is a side view of the foot rest structure 10 taken along line 1—1 of FIG. 3;

FIG. 2 is a side view of the base plate 14 showing the height adjustment locking shoulder means 20 on end 38;

FIG. 3 is a front view of the foot rest structure of FIG. 1 taken along line 3—3 of FIG. 1;

FIG. 4 is a top view of the foot rest structure;

DETAILED DESCRIPTION

Figure 5:
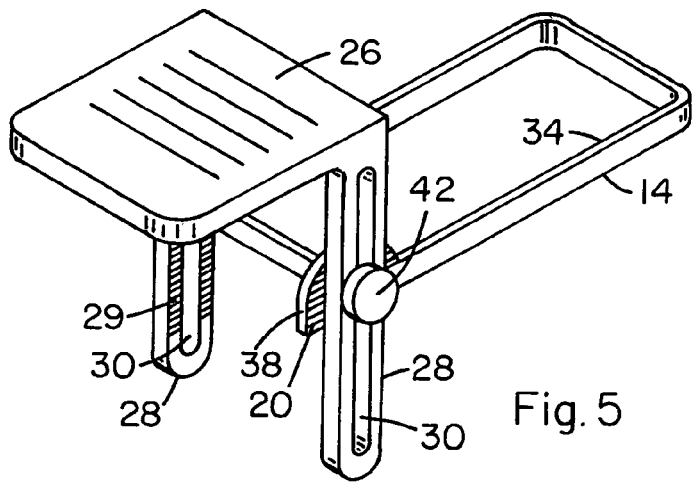
FIG. 5 is an approximately proportioned isometric view of the foot rest structure.

Referring to the drawings and with particular reference to the claims herein, the present invention in one of its preferred embodiments comprises as a foot rest structure generally designated 10, preferably of strong plastic such as PVC, structural butyrate, polypropylene or the like and including reinforced fabric or foamed polymer such as polyurethane or the like, for a child's restraining seat 12 and comprising base means 14 adapted to be positioned under the floor 16 of the restraining seat or to be an integral part of the restraining seat as manufactured and having an automobile seat contact plane 18, first stop or shoulder means 20 on a forward position of said base means, platform means 24 having a foot support portion 26 and a pair of position adjusting leg portions 28 each having an adjustment slot 30 and second stop or shoulder means 29 adapted to be nested with said first stop or shoulder means 20, said foot support portion 26 being disposed at a generally right angle to said portions 28, and clamping means generally designated 32 for maintaining the position of said platform means relative to said plane 18 by forcing 20 and 29 into nesting contact once the height adjustment has been made.

The present structure 10 is designed with four segments and exemplary dimensions are given therefor. The first segment is the base 14 preferably about twenty inches deep, eighteen inches wide and one eighth of an inch thick. This base may be an integral part of the restraining seat and formed, for example, as the floor of a conventional restraining seat during its manufacture. The sides or lips 34 of the base should be approximately one inch high to rigidify the platform means 24 which is adapted to rest under the restraining seat and be maintained in position thereby when the restraining seat is strapped down to the auto seat 35 by the seat belt 36. These lips also function as a guard or basin for spilled food or liquid. Enlarged ends 38 of sides 34 provide structural support for first stop 20 to allow the adjustable platform structure 24 to be moved readily up and down and tightened into place for travel.

Figure 6:
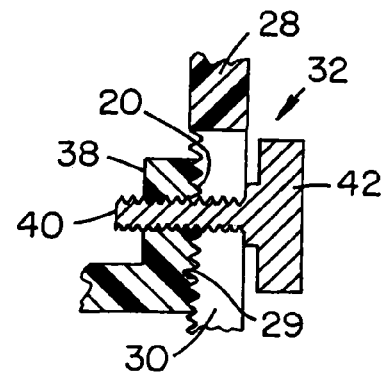
FIG. 6 is a cross-sectional view taken along line 6—6 of FIG. 1.
Figure 7:
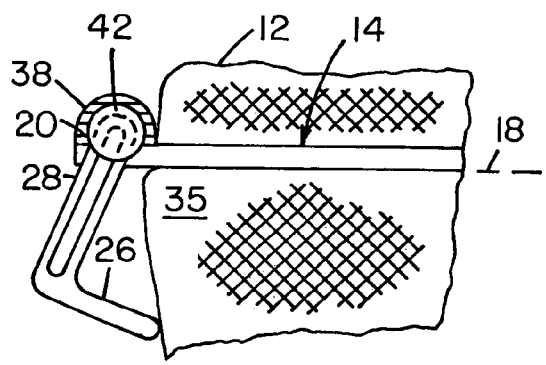
FIG. 7 is a view as in FIG. 1 in which the platform means 24 is rotated to a down position to accommodate long legged children.

The second segment is the platform means 24 which can be adjusted in height to the child's needs as the child grows. It consists of the foot support 26 approximately eighteen inches wide, four inches deep and one inch thick, and is integrally formed with legs 28 having center slots 30 for adjusting up and down. These legs, e.g., 12 in. long, and ends 38 have mating or nesting grooves or shoulders 20, 29 or the like as shown in FIG. 6 on adjacent surfaces to fix the foot support at different levels relative to base 14.

The third and forth segments preferably are cog type bolts or equivalent tightening means which allow the platform 24 to be tightened to base 14. FIG. 6 is an illustration of a type of tightening means which can be employed and consists of a bolt or stud 40 threadedly affixed to 38 and integral with tightening knob or nut 42 and extending thru slot 30. Any such tightening means can be employed including cam levers or the like.

Figure 8:
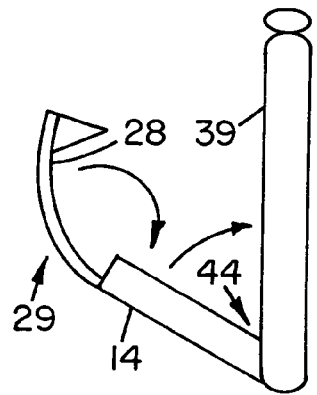
FIG. 8 is a side view partially of a variation the present restraining seat resting on an automobile seat and having a flop down foot rest structure.
Figure 9:
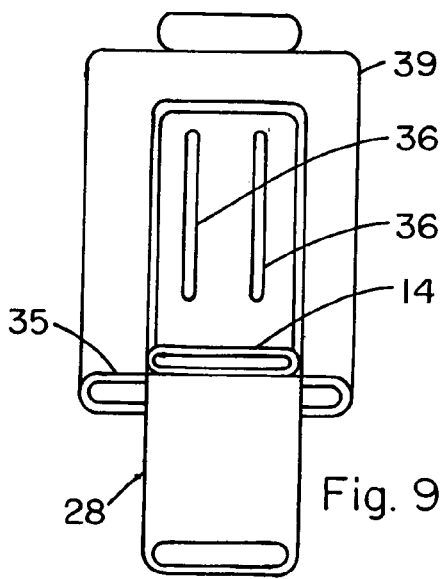
FIG. 9 is a front view of an automobile seat having a built-in restraining of the type of FIG. 8.
Figure 10:
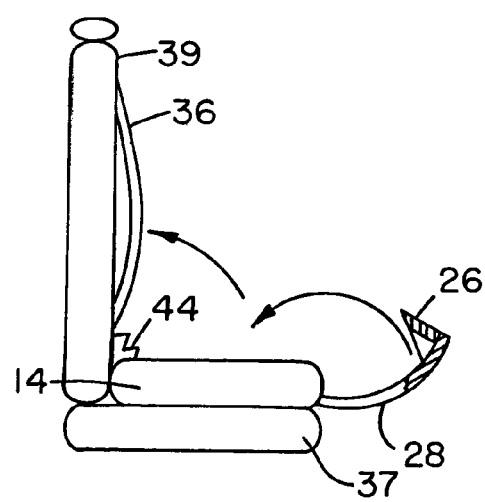
FIG. 10 is a side view taken along line 10—10 in FIG. 9 with a portion of the foot rest sectioned for clarity.

Referring to FIGS. 8–10 wherein certain structures are numbered as in FIGS. 1–7 for purposes of consistency of function, the leg portion 28 is of a flexible fabric material such as carpeting which can be readily folded backwardly onto the base means 14 which itself can be pivotally attached, e.g., by a fabric strip 44 or the like to a backrest section of the restraining seat or of a vehicle seat such that the base can be folded up against or into a cavity in the backrest of the seat.

Variations of the above structure may of course be made by those skilled in the art without departing from the spirit or scope of the present invention.

I claim:

1. A foot rest structure for a child's restraining seat comprising base means for supporting said restraining seat on a car seat, said base means having a car seat contact plane, first shoulder structure on a forward portion of said base means, platform means on said forward portion and having a foot support portion and a leg structure for positioning said foot support portion relative to said base means, said leg structure having adjustment slots and second shoulder structure adapted to be nested with said first shoulder structure, said foot support portion being disposed at a generally right angle to said leg structure, and clamping structure contacting said leg structure and said base means and when tightened functioning to maintaining the position of said platform means relative to said contact plane by forcing said first and second shoulder means into nesting contact once the height adjustment of said foot support portion has been made.

2. The structure of claim 1 wherein said clamping structure has tightening studs passing thru each said slot and around which said leg structure can pivot when said clamping structure is loosened, whereby said foot support portion can be positioned as to height with respect to said contact plane as well as rotated downwardly toward the front of a car seat thereby allowing a child's legs to dangle as desired for comfort.

3. The structure of claim 1 wherein said base means comprises the floor of a conventional child's restraining seat.

* * * * *